United States Patent [19]

Lefevre et al.

[11] Patent Number: 5,624,565
[45] Date of Patent: Apr. 29, 1997

[54] METHOD OF REGULATING AERATION IN A BASIN FOR BILOGICAL TREATMENT OF WASTEWATER

[75] Inventors: Fanny Lefevre, Poissy; Jean-Marc Audic, Conflans Sainte Honorine, both of France

[73] Assignee: Lyonnaise Des Eaux, Nanterre, France

[21] Appl. No.: 526,959

[22] Filed: Sep. 13, 1995

[30] Foreign Application Priority Data

Sep. 20, 1994 [FR] France .................... 94 11180

[51] Int. Cl.$^6$ .................................................. C02F 3/30
[52] U.S. Cl. .................... 210/614; 210/620; 210/630; 210/746; 210/903
[58] Field of Search ........................ 210/614, 620, 210/630, 746, 96.1, 903

[56] References Cited

U.S. PATENT DOCUMENTS

| | | |
|---|---|---|
| 4,548,715 | 10/1985 | Stein ........................ 210/614 |
| 4,797,212 | 1/1989 | von Nordenskjöld ........ 210/614 |
| 5,196,111 | 3/1993 | Nicol et al. .................. 210/96.1 |
| 5,304,308 | 4/1994 | Tsumura et al. . | |

FOREIGN PATENT DOCUMENTS

| | | |
|---|---|---|
| 0396057 | 11/1994 | European Pat. Off. . |
| 2935120 | 3/1980 | Germany . |
| 54-22955 | 2/1979 | Japan ........................ 210/614 |
| 2-169098 | 6/1990 | Japan ........................ 210/614 |
| 4-007095 | 1/1992 | Japan ........................ 210/614 |
| 4-104896 | 4/1992 | Japan ........................ 210/614 |

OTHER PUBLICATIONS

Water, Science & Technology, vol. 28, No. 10, Oct. 1993, London GB pp. 289–298.

Chemical Abstracts, vol. 122, No. 8, Feb. 20, 1995, Columbus, Ohio, US Abstract No. 88577.

*Primary Examiner*—Neil McCarthy
*Assistant Examiner*—Theodore M. Green
*Attorney, Agent, or Firm*—Amster, Rothstein, Ebenstein

[57] ABSTRACT

A method of regulating aeration in biological treatment of wastewater by implementing a step of eliminating carbon in aerobiosis, a step of nitrification in aerobiosis, and a step of denitrification in an anoxia, in which method the oxidation-reduction potential is continuously measured in a treatment system, a curve is established of variation in oxidation-reduction potential as a function of time, and the derivative thereof is calculated, wherein, when the derivative tends towards zero, the derivative and the value of the oxidation-reduction potential are correlated to determine whether aeration should be started, continued, or stopped.

1 Claim, 4 Drawing Sheets

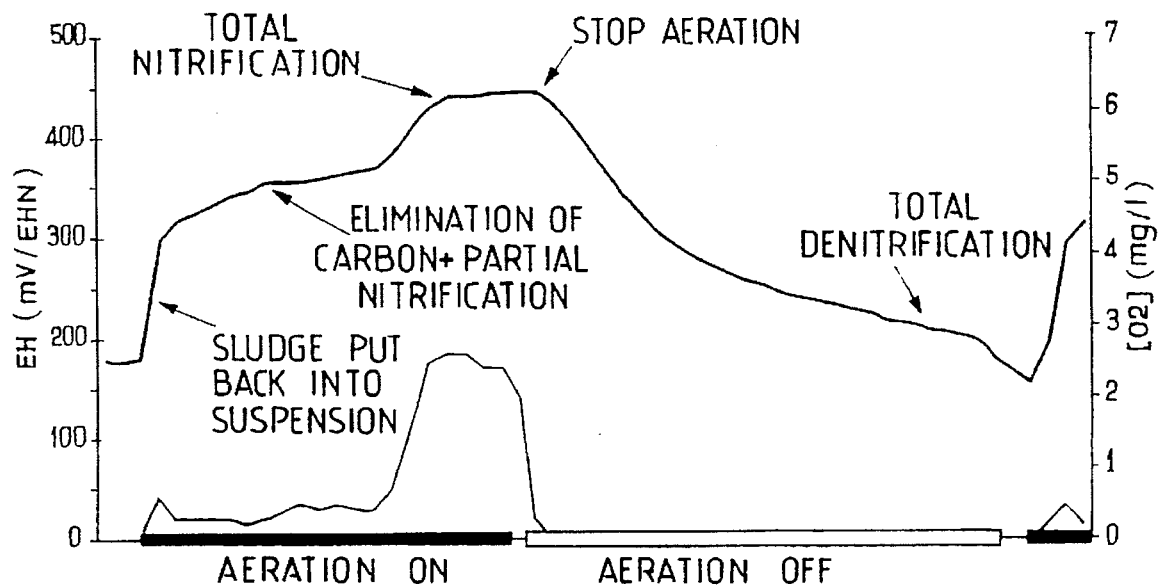
FIG_1
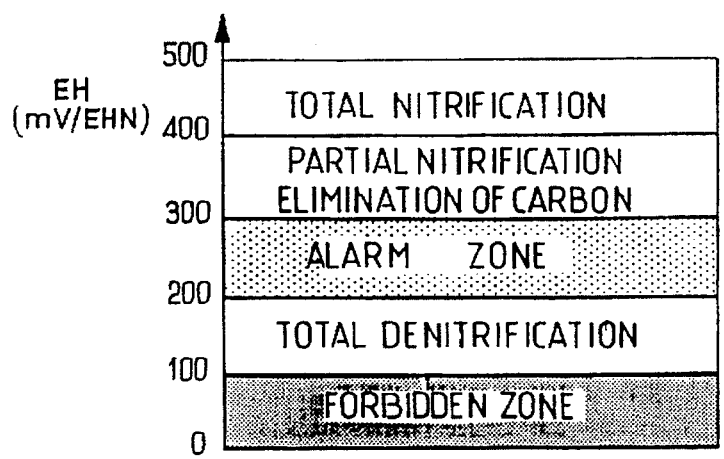
FIG_2

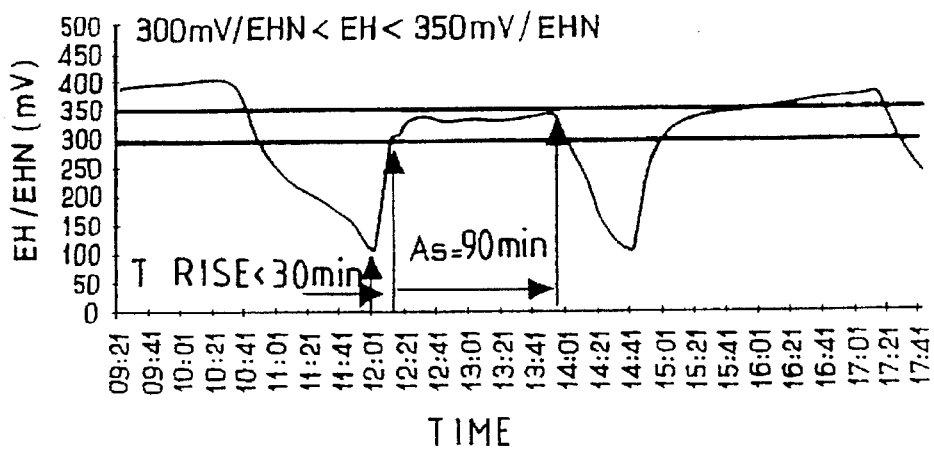
FIG_6a
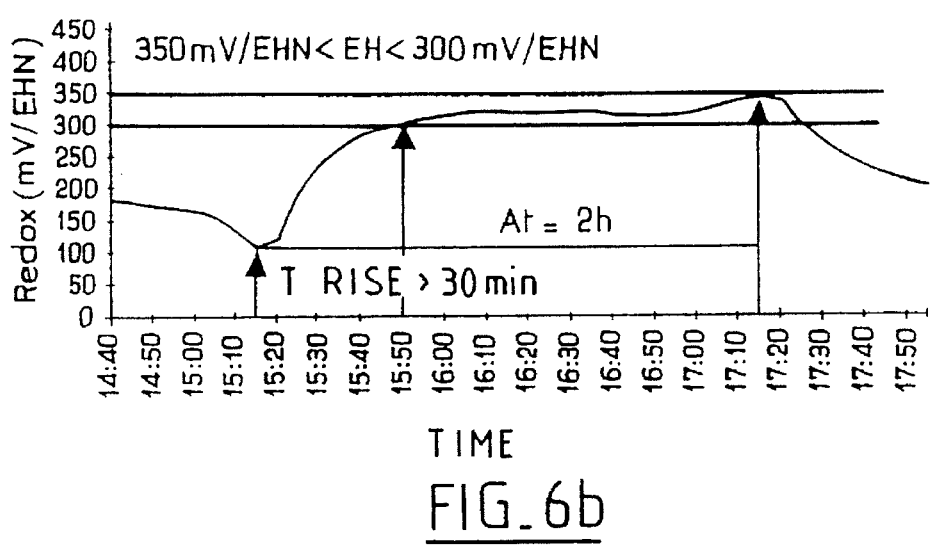
FIG_6b
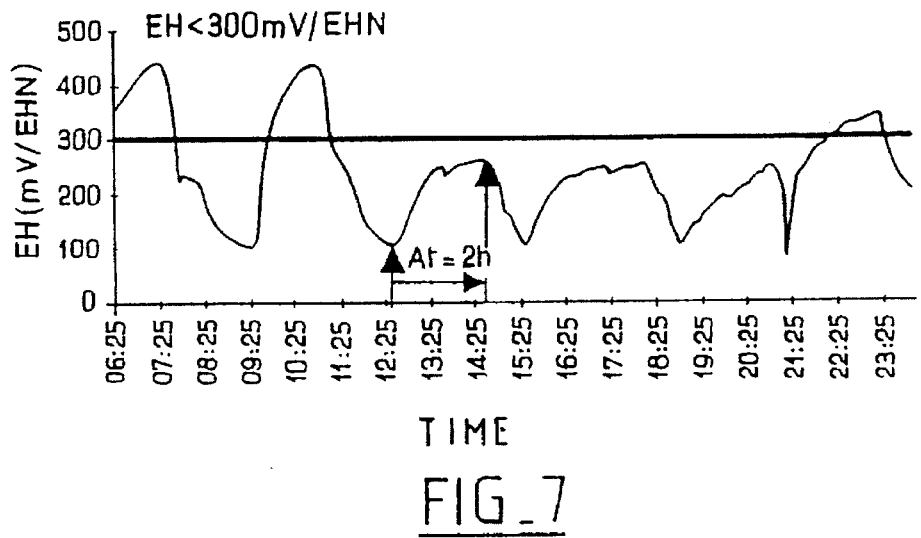
FIG_7

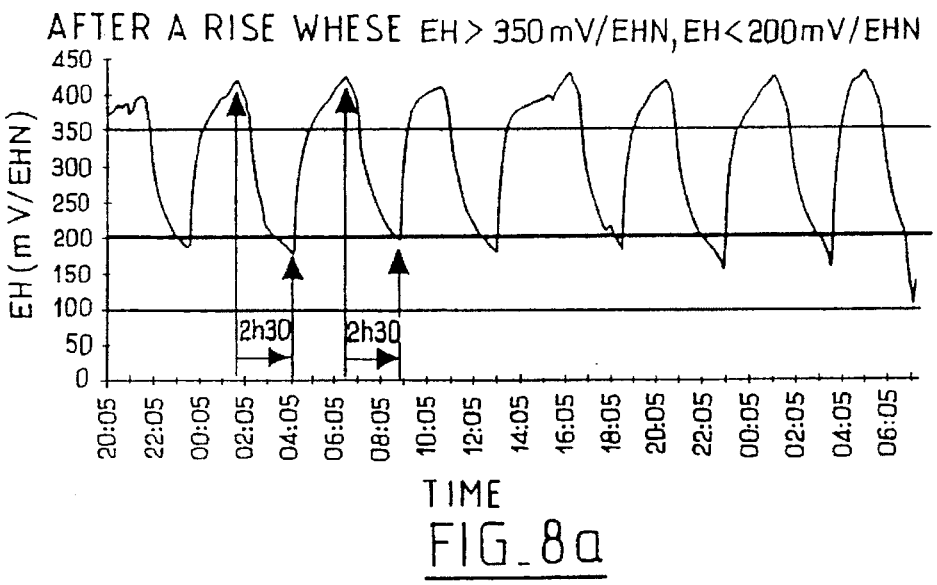
FIG_8a
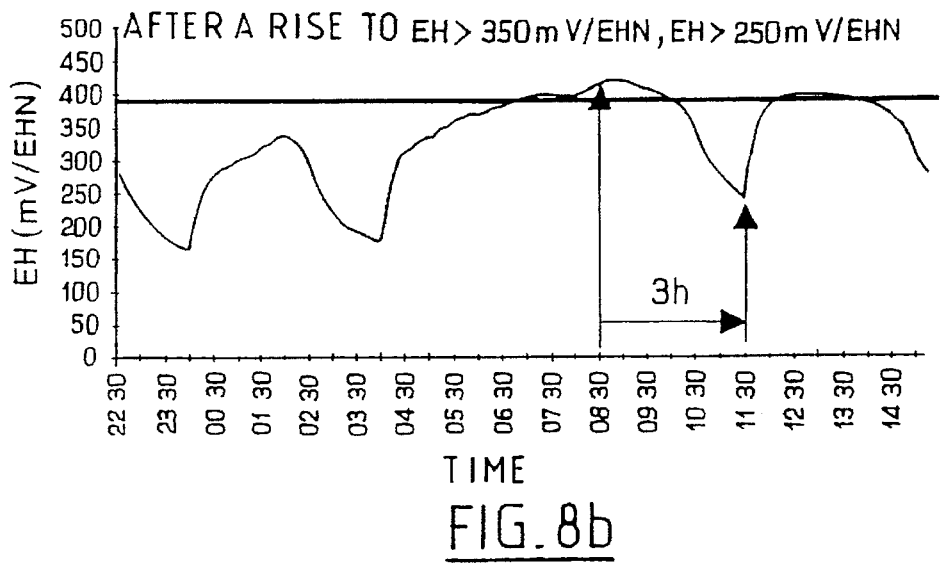
FIG_8b
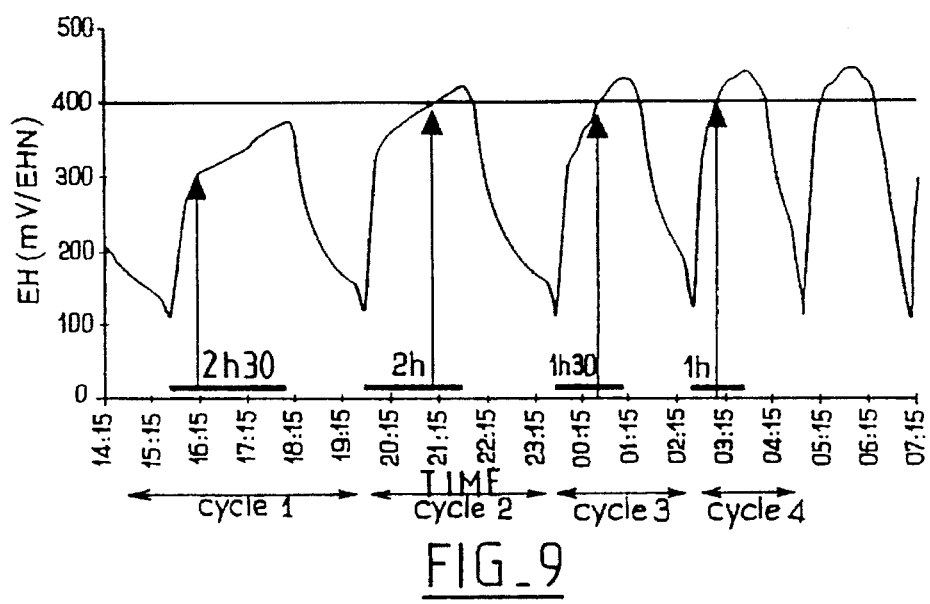
FIG_9

METHOD OF REGULATING AERATION IN A BASIN FOR BILOGICAL TREATMENT OF WASTEWATER

The invention relates to a method of regulating aeration in a basin for biological treatment of wastewater by implementing a step of eliminating carbon, a step of nitrification, and a step of denitrification.

BACKGROUND OF THE INVENTION

Application of the European Directive on sewage disposal seeks to limit the amount of non-treated wastewater that is discharged into the natural environment. In particular, treatment stations should fully purify all collected water, with the exception of water due to exceptional rain events. In addition, greater reliability of works is to be required. Effluent discharged into the natural environment should be of constant quality even when the wastewater to be treated varies very considerably both with respect to pollution load and with respect to flow rate. It is therefore necessary to keep the purification station in the best possible operating state, and to adapt operating criteria on a permanent basis in order to respond to any event that modifies the operating conditions of the biological treatment.

A large number of purification stations making use of activated sludge have only one treatment basin in which carbon pollution is eliminated and in which nitrification is performed, at least in part. Satisfying the European Directive makes it necessary, in certain cases, to achieve total nitrification and denitrification. All three treatment operations may be performed in a single basin, which then operates alternately in an aeration stage for eliminating carbon and for nitrification, and in an anoxia stage for denitrification.

Unfortunately, one of the main causes of misfunction in stations of this type is poor matching of oxygen supply whether because insufficient oxygen is supplied or because the availability of oxygen over time is inappropriate, thereby giving rise to poor results from the treatment. It is also possible to end up by losing sludge as can happen after spontaneous denitrification in the clarifier situated downstream from the biological treatment basin, and by suffering phenomena of anaerobiosis in the treatment basin due to insufficient oxygen in certain zones, thus giving rise, in the long term, to the appearance of filamentary bacteria and then of foam.

Devices have therefore been developed to regulate aeration in such treatment basins, but they still suffer from various drawbacks.

The use of cyclical dispensing equipment or "clocks" provides a solution in part only since such devices are set for a pre-established mean level of operation without adapting to variations. There is thus, for example, a serious risk of anaerobiosis leading quickly to damage of the biological medium.

The use of sensors measuring the dissolved oxygen or the oxidation-reduction potential, together with various combinations of sensors, serves to detect floor values, with a high threshold enabling aeration devices to be stopped, and a low threshold enabling aeration devices to be restarted. Timing devices are also used in case such thresholds are not reached.

In order to optimize nitrification and denitrification reactions, it is essential for oxygen to be supplied when necessary and in sufficient quantity, and not merely to supply oxygen, as is the case in previously described systems.

A first improvement in existing systems consists in continuously measuring the oxidation-reduction potential of the medium and in analyzing the shape of the curve showing this potential as a function of time:

EH=f(time), cf. 2nd International Specialized Conference on Design and Operation of Small Wastewater Treatment Plants, Trondheim, Norway, 28–30 June 1993, "Automatic Regulation of Activated Sludge Aeration", by F. Lefevre et al.

Analysis is performed by calculating the derivative and studying the derivative. If the derivative is positive, that means the oxidation-reduction potential is rising. If the derivative is negative, that corresponds to the oxidation-reduction potential falling in the anoxia stage. When the derivative is zero, then a stabilization stage is taking place.

The system then calculates the duration of aeration or non-aeration to be provided, which duration is equal to the duration of aeration or non-aeration necessary for bringing the oxidation-reduction potential to the required value for performing either carbon elimination or nitrification or denitrification, plus the additional amount of time required for actually performing the reaction.

Such a system nevertheless suffers from drawbacks since the curve of oxidation-reduction potential can be asymptotic in appearance (derivative tending to zero). Unfortunately, at certain values of the oxidation-reduction potential, it is absolutely essential to avoid switching to a quasi-stabilization stage since although conditions are not necessarily catastrophic for preserving the biomass, they are nevertheless inappropriate for the desired treatment.

OBJECT AND SUMMARY OF THE INVENTION

The invention thus solves the problem by providing a method of regulating aeration in biological treatment of wastewater by implementing a step of eliminating carbon in aerobiosis, a step of nitrification in aerobiosis, and a step of denitrification in an anoxia, in which method the oxidation-reduction potential is continuously measured in a treatment system, a curve is established of variation in oxidation-reduction potential as a function of time, and the derivative thereof is calculated, wherein, when the derivative tends towards zero, the derivative and the value of the oxidation-reduction potential are correlated to determine whether aeration should be started, continued, or stopped.

According to an additional and advantageous characteristic, the duration of aeration is determined while additionally taking into account earlier events (preceding steps of eliminating carbon, of nitrification, or of denitrification).

BRIEF DESCRIPTION OF THE DRAWINGS

Other characteristics and advantages of the present invention appear on reading the following detailed description given with reference to the accompanying drawings, in which:

FIG. 1 shows an example of the curve of oxidation-reduction potential as a function of time;

FIG. 2 is a diagram in which the oxidation-reduction range is subdivided into a plurality of zones;

FIGS. 3 to 8 illustrate specific implementations; and

FIG. 9 shows how earlier events are taken into account.

MORE DETAILED DESCRIPTION

Figure 3:
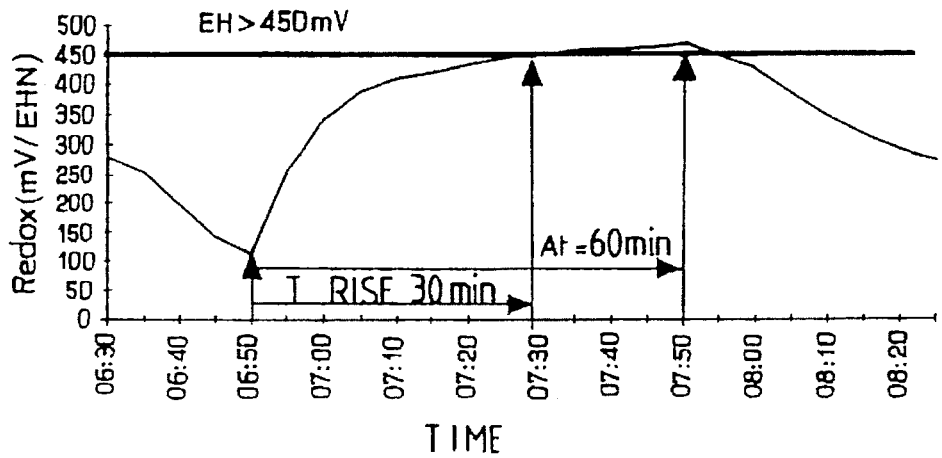

FIG. 1 shows a typical curve for oxidation-reduction potential as a function of time, together with cycles of aeration and of non-aeration. It can be seen that at the end of each biological step, the curve takes on an asymptotic appearance. These various "levels" enable the range of oxidation-reduction potential to be subdivided into a plurality of zones as shown in FIG. 2.

The zone in which the oxidation-reduction potential EH (i.e. the oxidation-reduction potential as measured at a hydrogen electrode in units of mV/EHN) lies in the range 0 to 100 is a forbidden zone since the risk of anaerobiosis is very high and that could damage the biomass severely. When EH lies in the range 100 to 200, conditions are appropriate for total denitrification since the system is in an anoxia stage. For EH values in the range 200 to 300, there exists a situation which is dangerous and which must not be allowed to last for too long since there is not enough oxygen to eliminate carbon while there is too much for denitrification to take place; this zone must be passed through as quickly as possible since no appropriate biological treatment takes place therein. For EH values in the range 300 to 400, carbon is eliminated and partial nitrification takes place. For EH values above 400, total nitrification occurs in the biomass (FIG. 2). The threshold values given above are merely indicative and may vary from one station to another.

By way of example, there follow below practical cases of detecting the oxidation-reduction potential EH, of the way it varies in time, and of the analysis thereof as performed by a controller, which analysis is followed by an action decision concerning aeration.

We begin by describing briefly the case where the absolute value of the derivative is relatively large, which corresponds to a rapid rise or fall in the redox potential.

During the aeration stage, if the EH value rapidly exceeds the value 450 mV/EHN ($T_{rise}$ less than 30 minutes), then the biological medium is assumed to be fully oxidized and to require little oxygen. It is therefore not necessary to perform aeration for long and the operating time of the aeration devices is limited, e.g. to 30 minutes.

During a non-aeration stage, if EH rapidly reaches the minimum or "floor" value (100 mV/EHN being the threshold value for the forbidden zone), then the aeration devices are automatically put back into operation.

As described below, when the derivative is zero, then a stabilization stage is taking place. Such stages are programmed as a function of measurements that have previously been preformed and analyzed.

I. AERATION STAGE: SLOW RISE TO EH=450 mV/EHN ($T_{rise}$>60 min)

Once the required EH value has been reached, the prior art system would have assumed that oxygenation was good and would have programmed a relatively short period of aeration, e.g. 30 minutes. According to the present invention, so long as the value of the derivative is not zero, it is assumed that for a given EH value, the system is well oxygenated but that a certain level of oxygen demand still exists, so a longer aeration stage At is programmed, e.g. lasting 60 minutes (FIG. 3).

II. AERATION STAGE: EH=400 mV/EHN HAS BEEN REACHED SLOWLY (E.G. IN MORE THAN 60 MINUTES)

Figure 4:
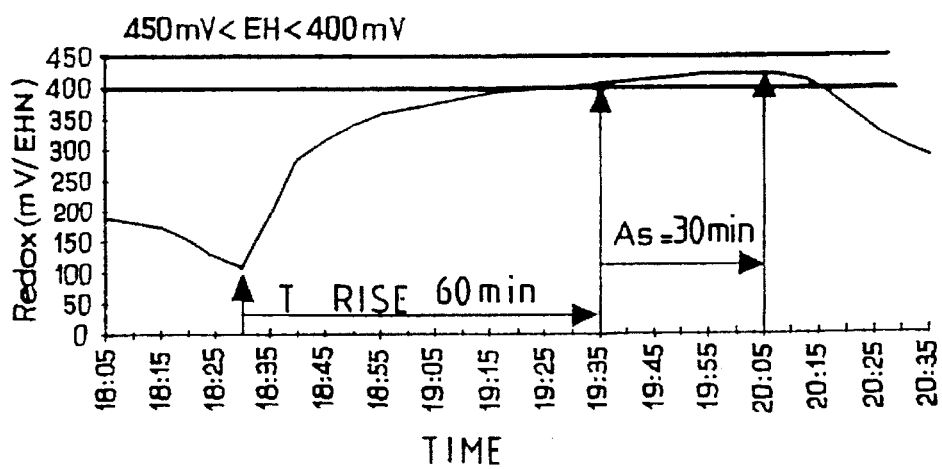

As soon as the value of EH reaches 400 mV/EHN, it is assumed that the nitrification reaction has terminated and that the populations of bacteria can be stabilized merely by allowing aeration for a minimum period of time. This stabilization time will generally be 30 minutes (As) (FIG. 4).

It should be observed that when this EH value is reached more quickly (absolute value of the derivative relatively large), then the additional aeration time should be longer in order to enable the populations of bacteria to reach the desired equilibrium.

III. AERATION STAGE: 350 mV/EHN<EH <400 mV/EHN

Figure 5:
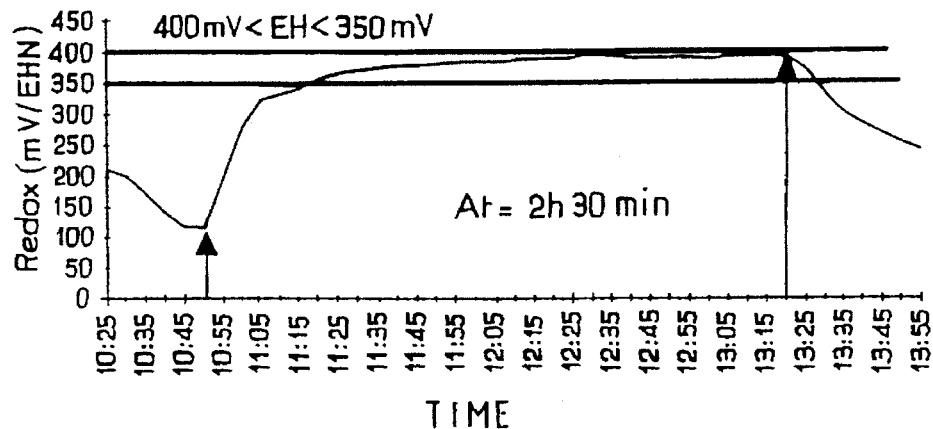

In this zone, nitrification takes place only partially. It is nevertheless necessary to continue aeration so as to complete oxidation of carbon pollution and to start the nitrification reactions. However, when EH rises slowly (curve tending towards an asymptote, i.e. derivative tending towards zero), it is necessary to stop total aeration regularly (FIG. 5) in order to be able to denitrify the little nitrogen that has nitrified.

IV. AERATION STAGE: 300 mV/EHN<EH <350 mV/EHN

When this range of EH potential is reached, it is known that the medium is poorly oxidized so treatment of carbon pollution is partial only and nitrification nonexistent. It is therefore essential for the biological medium to remain for as short a time as possible under such conditions. Nevertheless, it is considered that when the bottom value of 300 mV/EHN has been reached quickly after restarting aeration, the medium is poorly oxidized but the oxygen deficit for eliminating carbon is relatively small and the stage during which aeration is stabilized can be 90 minutes after EH has risen to 300 mV/EHN (FIG. 6a).

When the value of 300 mV/EHN is reached slowly (derivative tending towards zero), the aeration stage is limited to a value of 2 hours (FIG. 6b). If the value of 350 mV/EHN is not reached and exceeded after a plurality of aeration cycles (generally after three aeration cycles), then the controller disconnects itself and issues a warning signal indicating that the device is operating unexpectedly. This may be due to a problem with the hydrogen electrode, with the aeration devices (electromechanical problems, failure of the air diffusion systems), or with the station being subjected to an unusual overload of carbon pollution and/or nitrogen pollution, a significant increase in sludge concentration, etc., thereby greatly increasing the oxygen demand of the system.

V. AERATION STAGE: EH<300 mV/EHN

When the redox value remains below 300 mV/EHN, the duration of the aeration stage is limited to 120 minutes (FIG. 7), for example. In addition, if this situation continues after a plurality of aeration cycles, e.g. three cycles, then the controller disconnects itself and issues a warning signal, since this zone does not enable carbon to be eliminated and does not enable denitrification to be performed, so there is no point in leaving the biological medium under such conditions for too long a period since no appropriate reaction is taking place.

During the non-aeration stages between aeration stages in which the system is controlled as described above, the value of the oxidation-reduction potential EH decreases and is controlled as described below.

Naturally, since the denitrification reaction can take place only once nitrification has been performed, the system will not come back into operation until EH has reached values greater than 350 mV/EHN.

VI. NON-AERATION STAGE: EH<200 mV/EHN

If EH drops slowly to a value of less than 200 mV/EHN but without ever reaching the floor value (100 mV/EHN), the non-aeration stage is interrupted after a sufficient length of time, e.g. 2 h 30 min. (FIG. 8a). Similarly, if EH drops to a value that remains greater than 200 mV/EHN with a derivative tending towards zero, then aeration restarts after a certain lapse of time, e.g. after being switched off for 3 hours (FIG. 8b). In either case, aeration is restarted in order to prevent any long duration interruption that would lead to the sludge settling.

When EH drops to a value of less than 200 mV/EHN, it is important to limit the non-aeration stage to a relatively small value, since given the lack of accuracy in measuring the floor value (±25 mV), it could happen that the system is in the forbidden zone or in a zone very close to the forbidden zone without the aeration devices being automatically switched on. If the EH value remains above 200 mV/EHN, then it is possible to stay longer in this zone since there is considerably less risk of anaerobiosis.

VII. AERATION STAGE: TAKING ACCOUNT OF EARLIER EVENTS

It is particularly advantageous to take account of earlier events during pollution overload. When an aeration cycle does not manage to treat the overload in satisfactory manner, the controller takes account of that fact when analyzing the following cycles, as shown in the following example given with reference to FIG. 9.

Cycle 1: A pollution overload arrives that prevents the biological system from treating the incoming pollution in full: a backlog of non-degraded pollution therefore builds up. Redox variation shows that nitrification takes place only partially, so there is a residue of ammonia in the biological system (estimated on the basis of the redox value reached).

Cycle 2: Redox variation shows that nitrification takes place in full this time: the total aeration time of 2 h is calculated as a function of the nitrate residue accumulated during the preceding 2 h 30 min. sequence of aeration.

Cycle 3: Redox reaches 300 mV/EHN and 400 mV/EHN more quickly, which means that nitrification is quicker and complete: aeration time is calculated as a function of redox rise speed and of the nitrate residue still present: aeration times are reduced, e.g. to 1 h 30 min. If the residue is taken as being zero (redox value reached), the controller returns to normal analysis (as described in the preceding pages).

Cycle 4: Analysis returns to normal, nitrification being fast and total, and there being no more ammonia residue.

The method of the invention is implemented by using:

(1) a redox probe known to be highly reliable over time; and (2) a controller that continuously receives the measurement signal provided by the redox sensor or probe;

processes the resulting values to track variation in EH potential as a function of time and calculating the derivative; and programs the duration of aeration as a function of the received data and causing aeration to be switched on or off.

As a safety precaution, the system may be coupled to timers which serve to limit the length of time the aeration devices operate to some fixed maximum value so as to avoid excessive energy consumption when conditions for nitrification do not obtain, and to limit the off time of the aeration devices to a value that makes it possible to avoid allowing the sludge to settle for too long.

Naturally, other alarms could be envisaged without fundamentally altering the principle on which the above-described system operates.

We claim:

1. A method of regulating aeration in biological treatment of wastewater by implementing a step of eliminating carbon in aerobiosis, a step of nitrification in aerobiosis, and a step of denitrification in anoxia, in which method the oxidation-reduction potential is continuously measured in a treatment system, a curve is established of variation in oxidation-reduction potential as a function of time, and the derivative thereof is calculated, wherein, when the derivative tends towards zero, the derivative and the value of the oxidation-reduction potential are correlated to determine whether aeration should be started, continued, or stopped, and wherein the duration of aeration is determined by taking preceding steps of eliminating carbon, of nitrification, or of denitrification into account, the duration of aeration including sufficient time to bring the oxidation-reduction potential to a desired value, plus the additional time required for performing further steps of eliminating carbon, of nitrification, or of denitrification.

* * * * *